Sept. 12, 1967 R. A. HARRIS 3,340,600

METHOD OF INTERCONNECTING CONDUCTORS LOCATED ON OPPOSITE SIDES OF AN INSULATING BASE

Filed Nov. 2, 1964 4 Sheets-Sheet 1

INVENTOR
R. A. HARRIS

BY R. Y. Peters

ATTORNEY

TYPICAL CYCLE OF OPERATION

| TIME T, (SECONDS) | PHASE OF OPERATION |
|---|---|
| At T = 0 SEC. | RAM 25 STRIKES EYE-LETTING BLANK 17 & PRESSURE THEREON INCREASES TO A MAX-IMUM. |
| At T = $\frac{1}{6}$ SEC. | FACE PLATE 48 SEP-ARATES FROM ELECTRO-MAGNET 28 & PRESSURE DROPS TO A CONSTANT VALUE. |
| FROM T = $\frac{1}{5}$ SEC. TO t = $\frac{3}{10}$ SEC. | PULSE OF FUSING CUR-RENT PASSES THROUGH BLANK 17 TO MELT SOLDER COATING 19. |
| At T = 1 $\frac{3}{10}$ SEC. | SOLDER SOLIDIFIES & RAM 25 WITHDRAWS |

FIG. 5

United States Patent Office 3,340,600
Patented Sept. 12, 1967

3,340,600
METHOD OF INTERCONNECTING CONDUCTORS LOCATED ON OPPOSITE SIDES OF AN INSULATING BASE

Richard A. Harris, High Point, N.C., assignor to Western Electric Company, Incorporated, New York, N.Y., a corporation of New York Filed Nov. 2, 1964, Ser. No. 408,305
5 Claims. (Cl. 29—581)

ABSTRACT OF THE DISCLOSURE

A method of interconnecting conductive elements located on opposite sides of an insulating base includes first coating the conductive elements with a fluxing agent having insulating characteristics. A solder coated eyeletting blank is then inserted into an aperture formed through the conductive elements and the insulating base. The eyeletting blank is then deformed about the conductive elements with a ram and an anvil to mechanically interconnect the conductive elements. Next, a pulse of electrical current is passed through the ram and the deformed eyeletting blank. The fluxing agent maintains electrical insulation between the surfaces of the ram and anvil which contact the conductive elements so that substantially all of the current passes through the deformed eyeletting blank to melt the solder coating thereon to electrically connect the conductive elements and the eyeletting blank.

This invention relates to methods of and apparatus for interconnecting conductive elements located on opposite sides of an insulating base. More particularly, this invention relates to methods of making electrical and mechanical interconnections between conductors secured to the opposite sides of a thermoplastic insulating base. Also, this invention relates to apparatus for deforming and soldering eyeletting blanks to make the electrical and mechanical interconnections.

In the manufacture of printed circuit boards, electrical conductors are often secured to both sides of an insulating base. It is necessary not only to electrically interconnect these conductors but also to mechanically interconnect them. The mechanical interconnection of the conductors secures them to the insulating base to form a unitary package.

In the past, the electrical and mechanical interconnection of the conductors has often been achieved by the use of solder coated eyeletting blanks. These blanks are positioned in aligned apertures formed completely through both conductors and the insulating base. One end of the eyeletting blanks is then positioned over an anvil and a ram is moved downwardly to deform the other end of such blanks about the adjacent conductors and to pass simultaneously electrical current through the eyeletting blanks to melt the solder. Upon the solidification of the solder, not only are the conductors mechanically secured together with the insulating base therebetween but also the conductors are electrically interconnected.

Since frequently the insulating base is composed of a thermoplastic material which is plastically deformable, the deformation of the eyeletting blanks by the force of the ram against the blanks positioned on the anvil has often resulted in undesirable depressions in the region of the blanks. This problem is augmented by the heat of the fusing current used to melt the solder coatings on the eyeletting blanks; the heat puts the regions of the thermoplastic base surrounding the eyeletting blanks in a jelly-like state. Consequently, a ram and an anvil, both having broad contacting faces relative to the eyeletting blanks, are required to adequately support the thermoplastic base during the eyeletting operation and to prevent excessive depressions.

Since a broad faced ram and anvil are used in the soldering of a particular eyeletting blank, there is a very substantial tendency for fusing current to leak off the eyeletting blank being soldered through the conductors of the printed circuit board and through already deformed and soldered eyeletting blanks. Further, due to the high value of the fusing current, there is a substantial tendency for these conductors to burn out, producing an open circuit in such conductors.

It is, therefore, an object of this invention to provide new and improved methods of interconnecting conductive elements located on opposite sides of an insulating base.

Another object of this invention is the provision of methods of making electrical and mechanical interconnections between conductors secured to the opposite sides of a thermoplastic insulating base.

A further object of this invention is to provide methods of interconnecting with solder coated eyeletting blanks conductive elements located on opposite sides of a thermoplastic insulating base, wherein a fusing current melts the solder coatings and is prevented from leaking off the eyeletting blanks being soldered to prevent such fusing current from burning out the conductors of the printed circuit board.

With these and other objects in view, the present invention contemplates a method for interconnecting conductive elements located on opposite sides of an insulating base.

The method includes the steps of coating the conductive elements with a fluxing agent having insulating characteristics and inserting a deformable conductive member having a fusible metal coating thereon into an aperture formed through the conductive elements and the insulating base. Then the conductive member is deformed about at least one of the conductive elements to mechanically interconnect such elements while the coating of the fluxing agent maintains electrical insulation between the conductive member and the conductive elements. Next, a pulse of electrical current is directed to the deformed conductive member while the coating of the fluxing agent maintains electrical insulation between the deformed conductive member and the conductive elements to thereby pass substantially all of the current through the conductive member to melt the metal coating on such member to thereby form an electrical connection between the conductive elements and the conductive member.

Other objects and advantages of the present invention may be more clearly understood by reference to the following detailed description and the accompanying drawings, wherein:

FIG. 5 is a diagrammatic representation of a typical cycle of operation of the apparatus of FIGS. 3 and 4.

Figure 2:
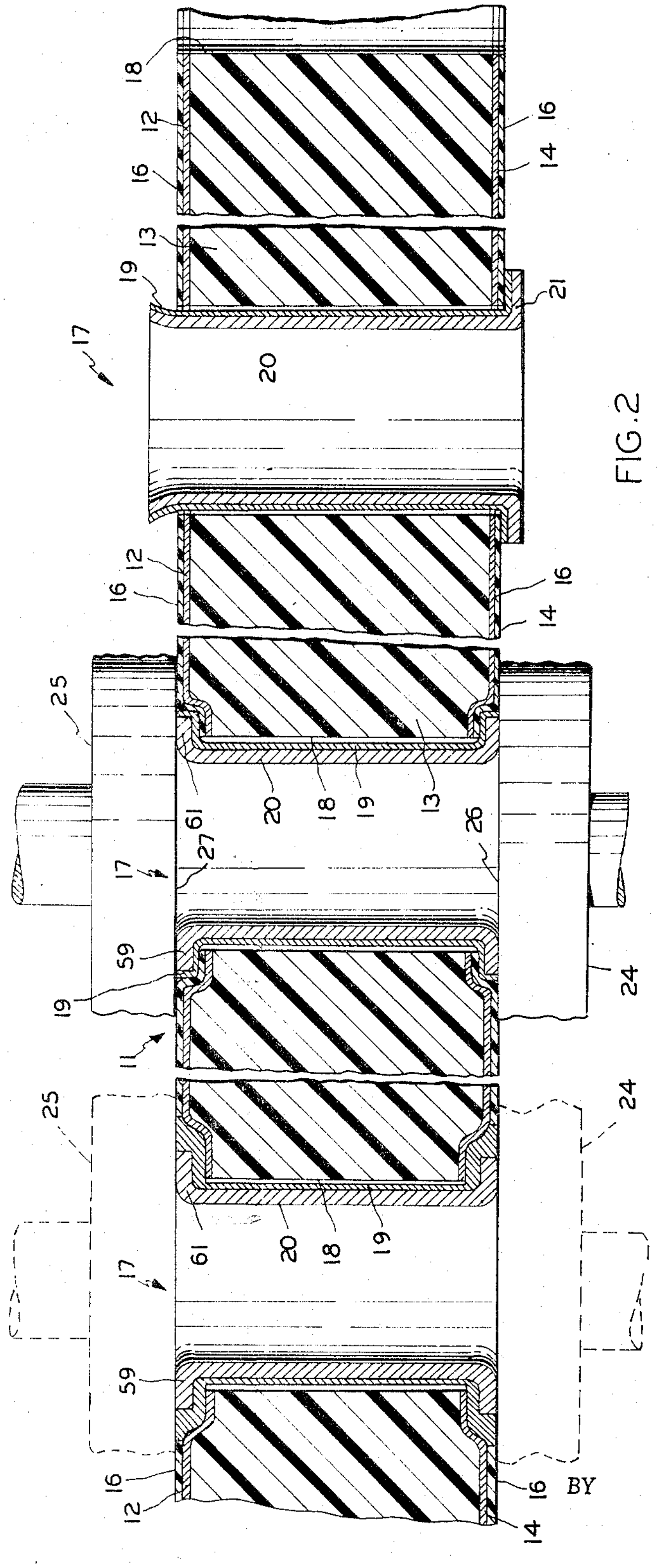
FIG. 2 is a front elevational sectional view of a printed circuit board, illustrating the various steps of the methods of the present invention of electrically and mechanically interconnecting conductors secured to an insulating base.
Figure 1:
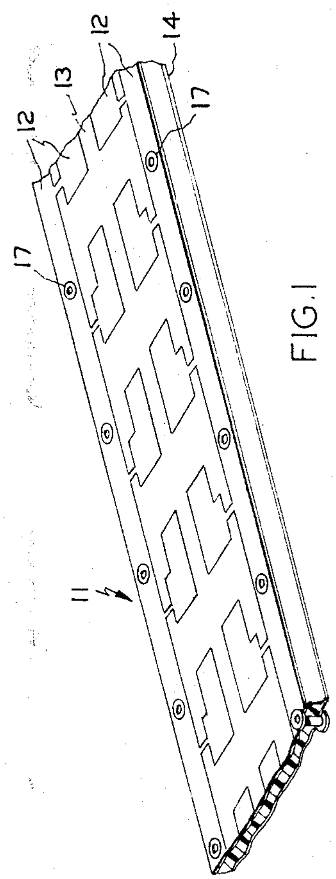
FIG. 1 is a fragmentary perspective view of a printed circuit board having a first plurality of conductors on one side thereof mechanically and electrically interconnected with a second plurality of conductors on the other side thereof.

Referring now to the drawings and in particular to FIG.

1, there is shown a printed circuit board, generally designated by the numeral 11. A first plurality of electrical conductive elements or conductors 12 is secured to one side of an electrical insulating base 13 composed of a thermoplastic material such as polyethylene or the like. Similarly, a second plurality of electrically conductive elements or conductors 14 is secured to the insulating base 13 opposite the conductors 12.

Typically, the conductors 12 and 14 are composed of a highly conductive material such as copper or the like, are gold plated to enhance their electrical characteristics, and are initially bonded to the insulating base 13 by the use of heat either alone or with adhesives.

In carrying out the methods of the present invention, a fluxing agent is applied to the entire outer surfaces of the conductors 12 and 14 to form a film 16 (FIG. 2) of flux on such conductors 12 and 14. The fluxing agent has electrical insulating characteristics while in its solid (non-liquid) state which occurs at room temperature. Also, the fluxing agent has electrically conductive characteristics in its liquid state and is capable of vaporizing when heated to remove any impurities that may be on the interface of a plurality of deformable members, rivets or eyeletting blanks 17, to assist in soldering such blanks 17 to the conductors 12 and 14. Advantageously, the fluxing agent is non-acidic at room temperatures and may be any conventional rosin base soldering flux.

The fluxing agent is applied to the printed circuit board 11 by dipping the entire board 11 in the fluxing agent, by spraying the fluxing agent on the surfaces of the board 11, by rolling the fluxing agent onto the surfaces of the board 11, or by any other conventional coating technique. Also, the fluxing agent either may be applied selectively to the surface area of the printed circuit board 11, or may be applied selectively to the surface area of the conductors 12 and 14 to coat the regions of the conductors 12 and 14 where the eyeletting blanks 17 will be ultimately located.

Next, a plurality of apertures 18 (FIG. 2) are formed completely through the conductors 12 and 14 and the insulating base 13 at those regions of the printed circuit board 11 where electrical and mechanical interconnections between the conductors 12 and 14 are desired. It is to be understood that the apertures 18 may be formed either before or after the conductors 12 and 14 have been coated with the fluxing agent.

The eyeletting blanks 17, which are coated with a heat fusible conductive material such as solder 19 (FIG. 2) or the like, are inserted either in a group or one at a time into the apertures 18, as shown in FIG. 2. Such insertion may be either manual or automatic.

Each eyeletting blank 17 has a hollow cylindrical body 20 and a flange 21 on one end thereof. Upon the insertion of each eyeletting blank 17 into each aperture 18, each flange 21 thereof engages the flux film 16 formed on the conductor 14. The end of the eyeletting blank 17 opposite the flange 21 preferably has a slight outward roll to enhance the subsequent deformation of such end.

Figure 3:
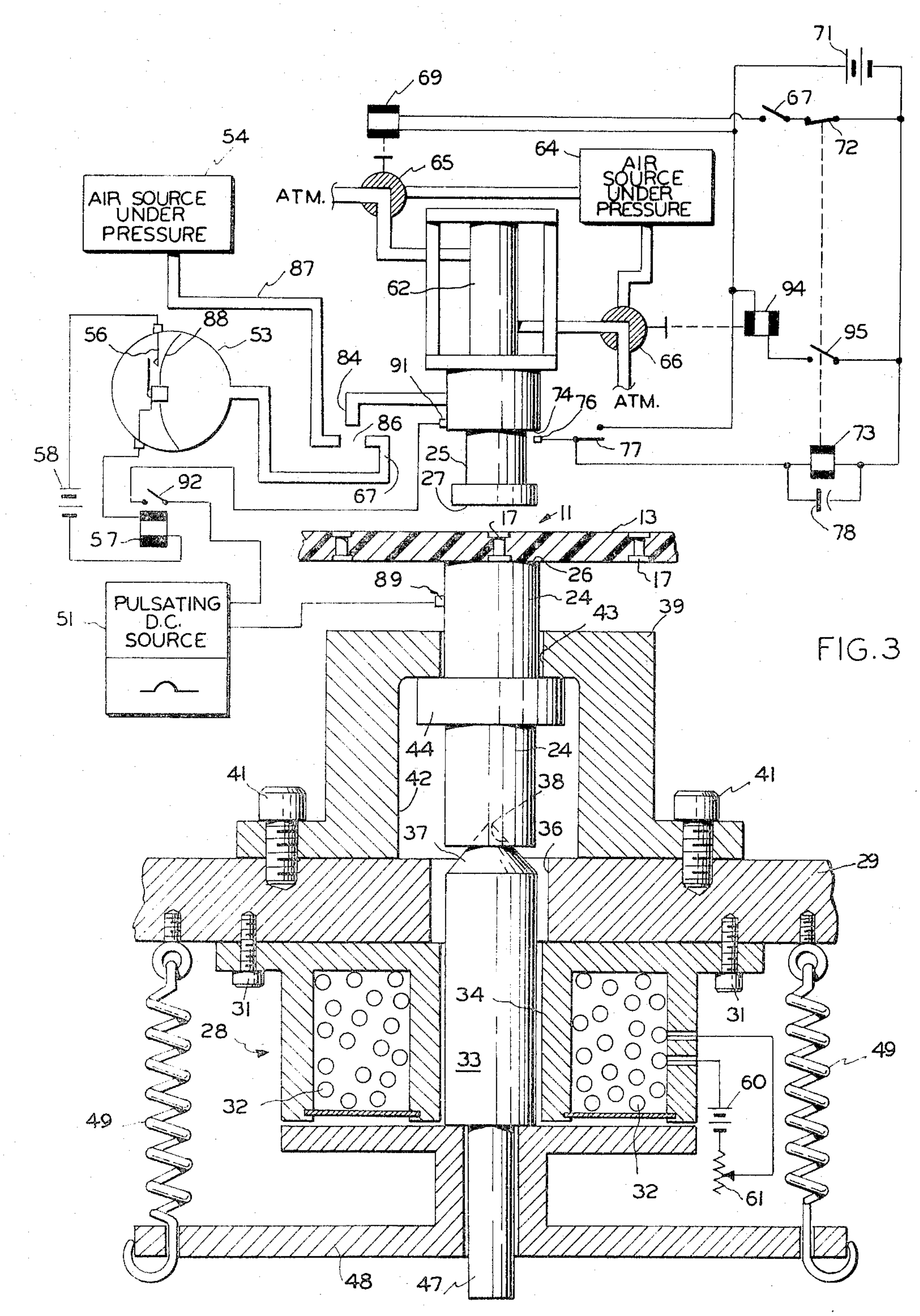
FIG. 3 is a front elevational view, partly in section, of an apparatus for deforming eyeletting blanks about the conductors of a printed circuit board and soldering the blanks to the conductors.

After each eyeletting blank 17 has been inserted within each aperture 18 of the printed circuit board 11, the printed circuit board 11 is then placed in a deforming device, such as an anvil 24 and a ram 25 of the deforming and soldering apparatus of FIG. 3. Both the anvil 24 and ram 25 have faces 26 and 27, respectively, with a surface area substantially larger than the surface area of a circle formed by the outer edge of the flange 21 of the eyeletting blank 17. Typically, each diameter of each of the faces 26 and 27 is about five times larger than the diameter of the circle of the flange 21.

Figure 4:
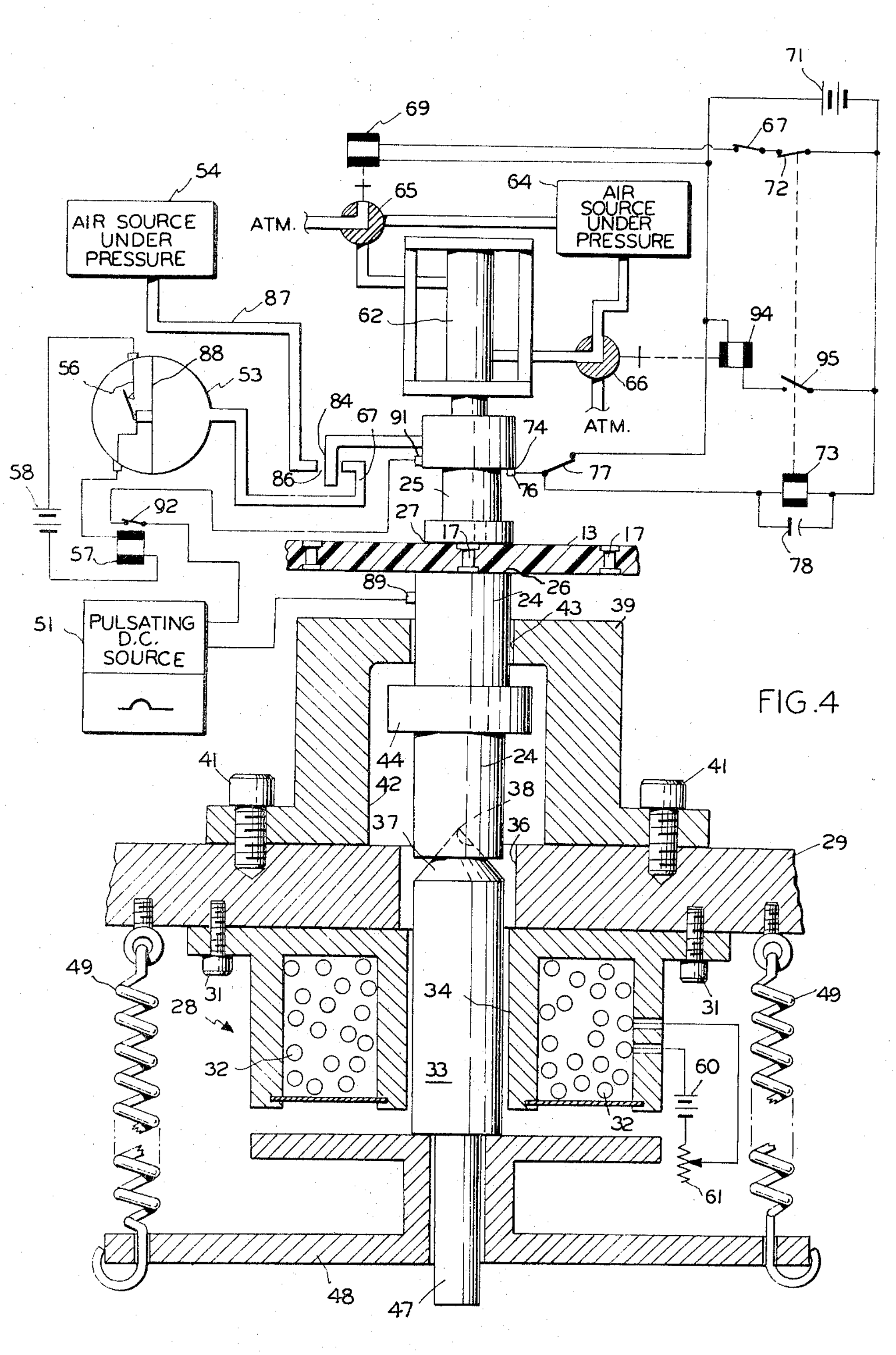
FIG. 4 is an enlarged front elevational view, partly in section of the apparatus of FIG. 3, showing a face plate separated from an electromagnet.

The deforming and soldering apparatus of FIGS. 3 and 4 includes an electromagnet, generally designed by the numeral 28, which is fixed to a frame 29 by any conventional securing means, such as threaded members 31 or the like. The electromagnet 28 includes an energizing coil 32 and a vertically movable armature 33 centrally mounted within an aperture 34 of such electromagnet 28. The armature 33 extends upwardly into an aperture 36 of the frame 29. Moreover, the armature 33 has a conically shaped upper end 37 which engages a conical indentation 38 of the anvil 24. The anvil 24 is movably mounted within a housing 39 which is fixed to the frame 29 by any conventional fastening means, such as threaded members 41 or the like. The housing 39 has a first opening 42 which extends to a restricted second opening 43. The anvil 24 is laterally restrained by the second opening 43 of the housing 39 and by the engagement of the upper end 37 of the armature 33 with the identation 38 of the anvil 24. Additionally, the anvil 24 includes a flange 44 fixed thereto and engageable with the housing 39 and the frame 29 for limiting the upward and downward movement of the anvil 24.

The vertically movable armature 33 also includes a rod-like extension 47 formed on the lower end thereof. The extension 47 has a diameter less than that of the armature 33. Fixed to the rod-like extension 47 is a face plate 48 composed of a paramagnetic material, such as iron, steel, or the like. Additionally, the face plate 48 has a plurality of tension springs 49, the ends of which are attached to the outer periphery of such plate 48 and to the frame 29, as shown in FIG. 3. The springs 49 maintain a certain desired pressure between the ram 25 and the eyeletting blank 17, and between the anvil 24 and such blank 17 during the soldering operation. The springs 49 also return the face plate 48 to the electromagnet 28 after the face plate 48 has been separated from such electromagnet 28.

The ram 25 and the anvil 24 are serially connected to a source 51 of electrical current, as shown schematically in FIG. 3, for heating the eyeletting blanks 17 to melt the solder coating 19 thereon. Although the source 51 may be either direct current or alternating current, it preferably is a pulsating direct current which supplies one pulse of direct current after the ram 25 deforms each eyeletting blank 17 against the anvil 24 and after the face plate 48 separates from the electromagnet 28. Typically, the source 51 supplies a direct current pulse having a sinusoidal shape with a duration of about $\frac{1}{10}$ second at 80 amperes and $1\frac{1}{2}$ volts about $\frac{1}{5}$ of a second after the ram 25 comes into contact with each eyeletting blank 17 and while the ram 25 remains in contact with the blank 17.

To make certain that the current from the source 51 is passed through the ram 25, the eyeletting blank 17, and the anvil 24 only after the eyeletting blank 17 has been completely deformed, a conventional time delay device is serially connected with the source 51, the ram 25 and the anvil 24. Advantageously, the time delay device is a conventional air sensor bellows 53 (schematically shown in FIG. 3) supplied by a source 54 of air under pressure and includes normally open contacts 56. Typically, the air sensor bellows 53, a relay 57 and a battery 58 are empirically either adjusted or selected to pass the current from the source 51 to the eyeletting blank 17 about $\frac{1}{5}$ of a second after the ram 25 comes into contact with the eyeletting blank 17. This insures complete deformation of the eyeletting blank 17 and insures substantial dampening of the vibratory energy produced by the ram 25 striking the eyeletting blank 17 prior to the heating of the eyeletting blank 17 by the current and prior to the soldering of such blank 17. Consequently, during the soldering of the eyeletting blank 17, there is substantially no relative movement between the eyeletting blank 17, the ram 25 and the anvil 24, thereby eliminating burning of the eyeletting blank 17 at the contacting points of the faces 27 and 26 and the flanges 59 and 21, respectively.

Further, the electromagnet 28 is energized by a power supply, such as a battery 60, the magnitude of the current of which is controlled by any conventional current controlling means, such as a variable resistor 61.

Before the eyeletting blanks 17 are deformed and soldered, certain preliminary adjustments of the deforming and soldering apparatus of FIGS. 3 and 4 are necessary to control the amount of deforming pressure applied by the ram 25 on the eyeletting blanks 17 of the printed circuit board 11. More specifically, the variable resistor 61 is adjusted to control the magnitude of the current passing from the battery 60 to the energizing coil 32 of the electromagnet 28. This adjustment, in effect, controls the magnetic field strength of the electromagnet 28 to establish a desired holding force exerted by the electromagnet 28 on the face plate 48. Typically, the adjustment of the variable resistor 61 is made by trial and error. For example, a certain holding force exerted by the electromagnet 28 on the face plate 48 is established by adjusting the variable resistor 61 to pass a certain magnitude of current from the battery 60 to the coil 32. Then, the ram 25 is brought downwardly into striking contact with a particular eyeletting blank 17 to deform it and to separate the face plate 48 from the electromagnet 28. The degree of deformation of the blank 17 and the depth of the depression in the board 11 caused by the ram 25 is noted and appropriate adjustments of the variable resistor 61 are made to obtain the desired degree of deformation of the blank 17 with a minimum depression in the board 11.

After the preliminary adjustments have been made and the printed circuit board 11 has been positioned on the vertically movable anvil 24, the ram 25 is moved downwardly by any of the conventional ram operating devices of the prior art. Advantageously, the operating device may be an air cylinder 62 connected to the ram 25 and supplied by a source 64 of air under pressure.

The air cylinder 62 is controlled by a pair of standard solenoid-controlled, two-way valves 65 and 66. The air cylinder 62 is actuated by closure of a switch 67 by an operator. Closure of the switch 67 energizes a solenoid 69 over a path including battery 71, solenoid 69, now closed switch 67, normally closed contacts 72 of unoperated relay 73.

Energization of the solenoid 69 rotates 90° the L-shaped passageway of the valve 65 to connect the source 64 to the air cylinder 62. Connection of the source 64 to the air cylinder 62 moves the piston thereof downwardly to move the ram 25 into the position shown in FIG. 4 in striking contact with a particular eyeletting blank 17 of the printed circuit board 11. Such striking contact deforms the end of the eyeletting blank 17 opposite the flange 21 about the conductor 12 adjacent such end to form the second flange 59, as shown in FIG. 2, on the eyeletting blank 17. These flanges 21 and 59 of the eyeletting blank 17 securely hold the conductors 12 and 14 of the printed circuit board 11 together with the insulating base 13 therebetween.

As the ram 25 moves downwardly, a shoulder 74 of the ram 25 engages a limit switch 76 to close its contacts 77. Closure of contacts 77 starts to charge a timing capacitor 78 over a path including source 71, now closed contacts 77 and capacitor 78 which short circuits the relay 73 during the transient conditions resulting from the closure of the switch 76. Also, closure of contacts 77 initiates a timing cycle for the relay 73 to subsequently operate it a predetermined time after the closure of such contacts 77.

After the ram 25 moves downwardly against the eyeletting blank 17, the pressure exerted by the ram 25 against the blank 17 increases to a maximum, at which time the face plate 48 separates from the electromagnet 28, as shown in FIG. 4. Typically, this separation occurs about ⅙ of a second after the ram 25 contacts the blank 17. Then, the pressure of the ram 25 on the blank 17 decreases immediately to a constant value, the magnitude of which is controlled by the force exerted by the tension springs 49. The springs 49 insure adequate electrical contact between the ram 25, the blank 17 and the anvil 24 for a subsequent soldering operation, while preventing excessive pressure by the ram 25 and the anvil 24 to thereby prevent excessive depressions in the insulating base 13 when the blank 17 is heated in the soldering operation.

Further, upon the downward movement of the ram 25, a shutter 84 fixed to the ram 25 in any conventional manner moves into an open section 86 of a conduit 87 to interrupt the flow of air from the source 54 into the air sensor bellows 53.

Interruption of the flow of air permits a diaphragm 88, which is normally urged by air from the source 54 to a leftward position, as shown in FIG. 3, to move rightwardly into the position shown in FIG. 4. Rightward movement of the diaphragm 88 closes the contacts 56 of the bellows 53 to operate the relay 57 over a path including now closed contacts 56, battery 58 and relay 57.

Operation of the relay 57 closes contacts 92 connecting the source 51 to the ram 25 and anvil 24 over a path including source 51, brush 89, anvil 24, eyeletting blank 17, now downwardly positioned ram 25, brush 91, now closed contacts 92 of now operated relay 57. As previously mentioned, the air sensor bellows 53, the relay 57, and the battery 58 are empirically either adjusted or selected so that the source 51 is connected to the anvil 24 and ram 25 about ⅕ of a second after the ram 25 first contacts the eyeletting blank 17.

Connection of the source 51 by the closure of the contacts 92 passes a pulse of current from such source 51 through the ram 25 and the eyeletting blank 17 in contact with the ram 25, and back through the anvil 24 in contact with such blank 17. This pulse of current heats the eyeletting blank 17 to melt the solder coating 19 thereon. Since the flux film 16 lies between the ram 25 and the conductor 12, and between the anvil 24 and conductor 14, the fusing current passes mainly through the eyeletting blank 17. In other words, the flux film 16 substantially insulates the conductors 12 and 14 from the source 51, preventing substantial leakage of current from the source 51 through the broad face 27 of the ram 25, the conductor 12, the already deformed and soldered eyeletting blanks 17, the conductor 14, the broad face 26 of the anvil 24, and back to the source 51. Effectively, two layers of flux film 16—the layer on the conductor 12 and the layer on the conductor 14—serve to insulate such conductors 12 and 14 and the already deformed and soldered eyeletting blanks 17 from the source 51. Therefore, as previously mentioned, substantially all of the fusing current passes through the eyeletting blank 17 which has just been deformed, and the conductors 12 and 14 are not burned out by the fusing current. As a result, only that portion of the insulating base 13 surrounding the eyeletting blank 17 is heated. Since the pressure of the ram 25 on the eyeletting blank 17 is decreased when fusing current is passed through such blank 17 during the soldering operation, and since the faces 27 and 26 of the ram 25 and anvil 24, respectively, are substantially larger in area than the circle of the flanges 21 and 59 of the blank 17, the printed circuit board 11 is adequately supported during the soldering operation and therefore only a minimum depression is made in the board 11 by the ram 25 and anvil 24. Moreover, the solder coating 19 on the eyeletting blank 17 quickly melts and vaporizes the flux film 16 at the interface of the flanges 21 and 59 of the eyeletting blank 17 and the conductors 12 and 14 to solder such blank 17 to the conductors 12 and 14.

In a typical installation, such as, for example, displayed diagrammatically in FIG. 5, the fusing current is in the order of about 80 amperes at 1½ volts and has a duration of about ⅒ of a second, as mentioned above. Due to the insulating effect of the flux film 16, the 1½ volts is not capable of breaking down the insulating characteristics of the flux film 16 to any substantial degree. Consequently, about 85% of the fusing current passes directly through the eyeletting blank 17 being soldered, whereas only about 15% of such fusing current leaks through the conductors 12 and 14 and already deformed and soldered eyeletting blanks 17. Hence, the conductors 12 and 14 are not burned out by the fusing current.

After the fusing current has melted the solder coating 19 of the eyeletting blank 17, the ram 25 remains in contact with the blank 17 for a period of time, typically 1 second, necessary to insure complete solidification of the molten solder. Such contact prevents relative movement of the blank 17 and both conductors 12 and 14 due to their inherent resiliency and due to the resiliency of the base 13 during the time that the solder solidifies. The prevention of this relative movement results in a good solder connection with desirable electrical properties. Also, to hasten the solidification of the solder, a coolant, such as a blast of air, may be directed on or passed within the ram 25 and anvil 24.

After the lapse of a period of time wherein the solder solidifies and the ram 25 remains in contact with the eyeletting blank 17, the capacitor 78 times out and the relay 73 operates over a path including battery 71, now closed contacts 77 of limit switch 76, and relay 73.

Operation of the relay 73 closes contacts 95 energizing a solenoid 94. The energizing path may be traced from battery 71, solenoid 94, now closed contacts 95 of now operated relay 73.

Energization of the solenoid 94 rotates the L-shaped passageway of the valve 66 to connect the source 64 to the air cylinder 62.

Moreover, operation of the relay 73 opens contacts 72 de-energizing solenoid 69, simultaneous with the energization of the solenoid 94, to rotate 90° the L-shaped passageway of the valve 65 to permit escapement of the air under pressure behind the piston of the air cylinder 62.

The escapement of the air in the air cylinder 62 and the connection of the source 64 to the bottom of the piston of the air cylinder 62 withdraws the ram 25; whereupon, the springs 49 return the face plate 48 into engagement with the electromagnet 28. The electromagnet 28 then takes over control of the face plate 48 and maintains it in engagement with the electromagnet 28. Thus, a cycle of operation of the deforming and soldering apparatus of FIGS. 3 and 4 is complete.

As a result of the completion of the cycle of operation, an eyeletting blank 17 has been deformed by the ram 25 and anvil 24 with a pressure accurately controlled by the electromagnet 28, and the eyeletting blank 17 has been electrically interconnected to the conductors 12 and 14 by the melting of the solder coating 19 of the eyeletting blank 17. Other eyeletting blanks 17, which have been positioned within the apertures 18, are also deformed and soldered with the apparatus of FIGS. 3 and 4 to mechanically connect the conductors 12 and 14 to the insulating base 13 and electrically and mechanically interconnect such conductors 12 and 14.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of interconnecting conductive elements located on opposite sides of an insulating base, comprising the steps of:
- coating said conductive elements with a fluxing agent having insulating characteristics,
- inserting a deformable conductive member having a fusible metal coating thereon into an aperture formed through the conductive elements and the insulating base,
- deforming said conductive member about at least one of said conductive elements with a ram and an anvil, each having a contact surface larger than the diameter of said conductive member to mechanically interconnect said elements, and

- directing a pulse of electrical current through said ram, said deformed conductive member, and said anvil, while said fluxing agent maintains electrical insulation between the contact surfaces of said ram and anvil and said conductive elements to thereby pass substantially all of said current through said member to melt said metal coating on said member to form an electrical connection between said conductive elements and said member.

2. The method of making mechanical and electrical interconnections between electrically interconnected conductors secured to the opposite sides of an insulating base, comprising the steps of:
- coating the surfaces of said conductors with a fluxing agent having insulating characteristics,
- inserting a solder coated rivet having a flange on one end thereof into an aperture extending through both the conductors and the insulating base with the flange of the rivet contacting one of the conductors,
- deforming the end of the rivet opposite the flange about the conductive element adjacent said end with a ram and an anvil, each having a contact surface larger than the diameter of the rivet, and
- directing a pulse of electrical current through said ram, said anvil, and said rivet, while said fluxing agent insulates the conductors from said ram and anvil to prevent leakage of said current through said conductors and to thereby pass substantially all of said current through said rivet to melt said solder coating thereon to form an electrical connection between said conductors and said rivet.

3. The method of making a plurality of mechanical and electrical interconnections between conductors secured to the opposite sides of a thermoplastic insulating base, comprising the steps of:
- coating the conductors with a soldering flux having insulating characteristics,
- inserting a plurality of solder coated eyeletting blanks each having a flange on one end thereof into a plurality of apertures formed through both conductors and the base,
- exerting a pressure successively on each end of the blanks with an anvil and a ram both having contacting faces substantially larger than the flange of the eyeletting blank to deform successively the ends of the blanks opposite the flanges about the conductor adjacent said ends and opposite the flange while said flux coating maintains electrical insulation between the ram and anvil and the conductors,
- decreasing the pressure while maintaining the ram and anvil in successive contact with each blank,
- passing a pulse of current from the ram successively to each blank and back through the anvil to melt the solder coating on each eyeletting blank while the flux coating prevents substantial leakage of current through the conductors thereby mechanically and electrically interconnecting the conductors upon the solidification of the solder.

4. The method of making mechanical and electrical interconnections between conductors secured to the opposite sides of an insulating base, comprising the steps of:
- coating the surfaces of said conductors with a flux having insulating characteristics,
- inserting a first solder-coated rivet having a flange on one end thereof into an aperture extending through both the conductors and the insulating base with the flange of the rivet contacting one of the conductors,
- deforming the end of the first rivet opposite the flange about the conductor adjacent said end,
- directing a pulse of electrical current through said rivet to melt the solder coating on said rivet to form an electrical connection between said conductors and said rivet,
- inserting a second rivet into another aperture extending through both the conductors and the insulating base with the flange of the rivet contacting one of the conductors, deforming the end of the second rivet opposite the flange about the conductor adjacent said end with a ram and an anvil both having contacting faces substantially larger than the diameter of the rivet, and directing a pulse of electrical current through said ram, second rivet, and anvil, while said flux coating insulates the conductors from said ram and anvil to prevent leakage of said current through said conductors and said first rivet to thereby pass substantially all of said current through said second rivet to melt the solder coating thereon to form another electrical connection between said conductors and said second rivet.

5. The method of interconnecting conductive elements located on opposite sides of an insulating base, comprising the steps of:

coating said conductive elements with a fluxing agent having insulating characteristics in its solid state, inserting a deformable conductive member having a fusible metal coating thereon into an aperture formed through the conductive elements and the insulating base, exerting a constantly increasing pressure on said conductive member with a deforming device having contact faces substantially larger than the diameter of said conductive member on said conductive member to deform said member about at least one of said conductive elements to mechanically interconnect said elements while said fluxing agent maintains electrical insulation between said deforming device and said elements, decreasing abruptly said increasing pressure to a constant value, directing a pulse of electrical current through said deforming device to said deformed conductive member while said fluxing agent maintains electrical insulation between said deforming device and said conductive elements to thereby pass substantially all of said current through said member to melt said metal coating on said member to form an electrical connection between said conductive elements and said member, maintaining said deforming device in contact with said conductive member while said melted metal coating solidifies, and removing said deforming device from said conductive member.

References Cited

UNITED STATES PATENTS

| | | | |
|---|---|---|---|
| 800,994 | 10/1905 | Douglas | 78—53.5 |
| 1,670,700 | 5/1928 | Weed | 219—117 |
| 2,779,998 | 2/1957 | Bailey | 29—470.5 X |
| 2,909,643 | 10/1959 | Graves | 219—117 |
| 2,957,237 | 10/1960 | Regle | 29—470.5 |
| 3,063,346 | 11/1962 | Lloyd et al. | 90—11.52 |
| 3,067,488 | 12/1962 | Bennett et al. | 29—155.5 |
| 3,143,787 | 8/1964 | Babbe. | |
| 3,264,524 | 8/1966 | Dahlgren et al. | |

JOHN F. CAMPBELL, *Primary Examiner.*

J. L. CLINE, *Assistant Examiner.*